Figure 1:
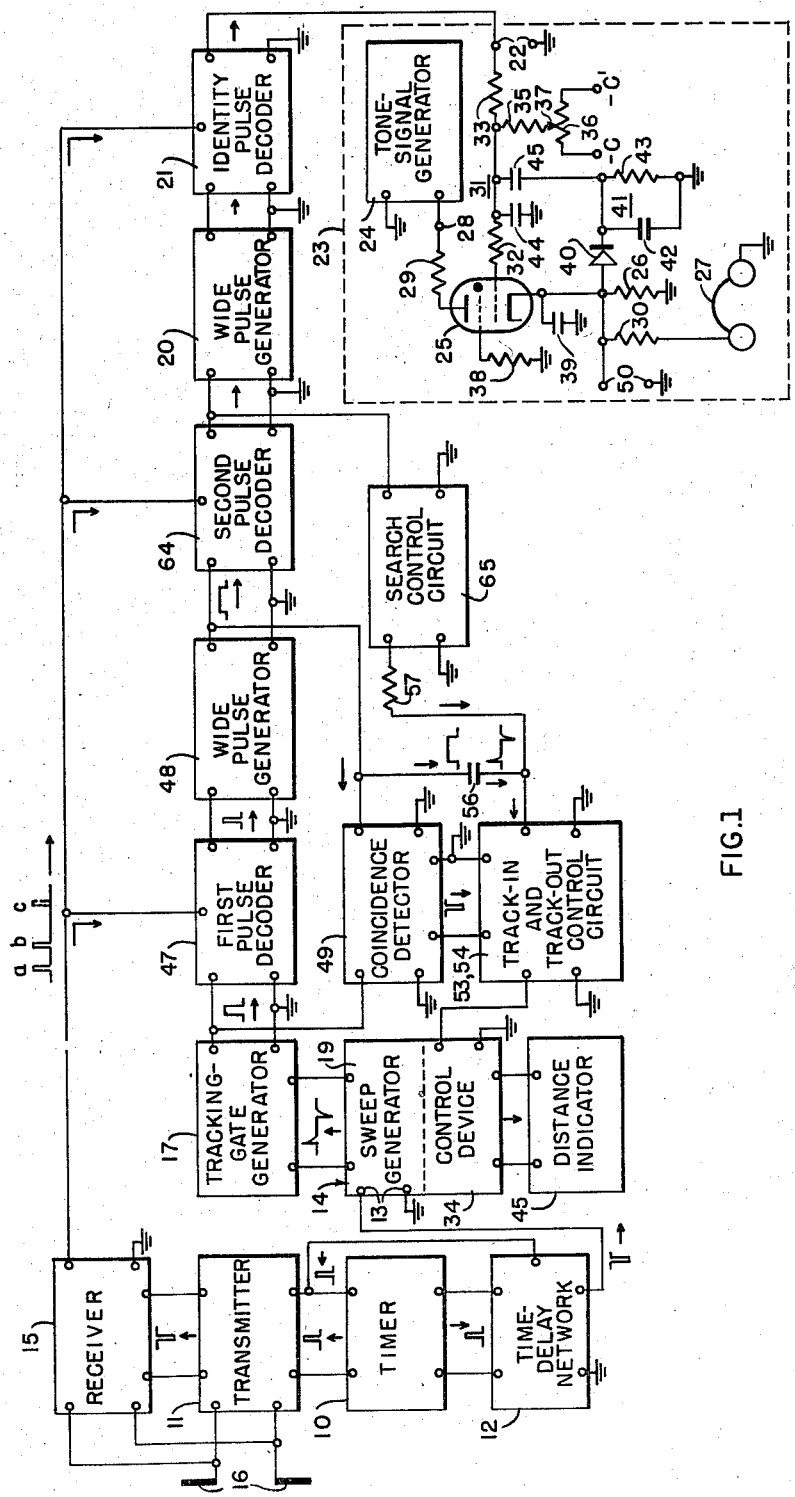

United States Patent Office 2,881,410
Patented Apr. 7, 1959

2,881,410

IDENTITY-INDICATING SYSTEM FOR RADIO POSITION LOCATOR

Robert B. J. Brunn, deceased, late of Manhasset, N.Y., by Eleanor B. Brunn, executrix, Plandome, N.Y., assignor to Hazeltine Research, Inc., Chicago, Ill., a corporation of Illinois Application July 30, 1954, Serial No. 446,834

10 Claims. (Cl. 340—164)

General

The present invention is directed to repeaters or identity-indicating systems for radio position locators. Such systems have particular utility in radio position locators employed for aerial navigation purposes and, hence, will be described in that environment.

Radio position locators, such as the distance-measuring equipment employed in aircraft navigation systems, include an airborne transmitter-receiver called an interrogator-responser which transmits periodic groups or pairs of radio-frequency pulses spaced in accordance with a predetermined code and receives in response thereto from a receiver-transmitter called a ground-station beacon or transponder periodic groups or pairs of radio-frequency reply pulses also spaced in accordance with a predetermined code. The reply pulses are detected and then decoded by two decoders of the interrogator-responser and a voltage is derived therein which is representative of the round-trip propagation time between the aircraft and the terrestrially located beacon. This voltage is applied to a distance indicator which provides a visual indication of the slant range between the aircraft and the beacon.

Two additional types of information are transmitted to the aircraft and this information is intermediate some of the periodic groups of reply pulses which emanate from the ground-station beacon. One type of information comprises periodic identity-indicating radio-frequency pulses which are transmitted by the beacon a predetermined interval, such as 10.5 microseconds, after some of the groups of reply pulses. Each identity-indicating pulse, therefore, effectively comprises the third pulse of a group of three coded pulses. These identity-indicating pulses are translated by the third decoder of the interrogator-responser and thereafter are employed to switch in a recurring audible signal which indicates the presence of those pulses. Consequently, when an aviator hears this signal, he can feel fairly certain that the interrogator-responser is responding to reply pulses from the beacon rather than to random noise pulses and other unwanted pulse combinations, such as those radiated by other interrogating aircraft, which might by chance actuate the paired-pulse decoders and the third decoder and provide an unwanted or false output signal.

The other type of information transmitted to the aircraft under consideration is that employed to identify the airport which the aircraft is approaching. This information is transmitted to the craft by another transmitter associated with the ground-station beacon and is received on a separate receiver on the aircraft. The airport-identifying information from this receiver together with the identity-indication pulses from the interrogator-responser are applied to a common utilizing circuit comprising the headphones worn by the pilot.

The sequence of the transmission to the aircraft of the airport-identifying information and the identity pulses is such that the pilot recurrently hears in his headphones the airport-identifying information, which may be in Morse code, followed by an indicating or tone signal which is produced in response to the indication pulses. The reception of the two types of information in this particular sequence informs the pilot that his distance-measuring equipment is conditioned to receive distance information from the ground-station beacon of the particular airport which his craft is approaching. In the event that an overlapping of these two types of received information occurs wherein portions of that information are coextensive in time, the aviator becomes aware of the fact that the identity pulses are being received from a beacon situated at an airport other than the one from which the airport-identifying information is being transmitted. This could occur, for example, when the aircraft is intermediate airports such as Baltimore and Washington. In such an instance, the aviator would adjust one of his tuning controls so as to receive the two types of information from the same airport.

Prior identity-indicating systems for interrogator-responsers of radio position locators have included a switching device having an input circuit coupled to an identity pulse decoder and having an output circuit associated with a pair of headphones coupled through the switching device to a source of a tone signal. This input circuit included a time-constant network which required a predetermined number of successive identity pulses for charging the condenser of the network to a given voltage level to actuate the switching device in order to translate a tone signal to the headphones associated with its output circuit. A train of pulses following the successive pulses just mentioned so controls the switching device that it permits the translation of the tone signal to that output circuit until substantially the end of the train of pulses. After a given interval in which the tone signal is absent, a succeeding group of identity pulses enables the switching device, and a tone signal, which lasts about two seconds, is applied to the headphones until the end of the group of pulses. This periodic actuation of the switching device causes the aviator recurrently to hear a tone signal which is representative of the presence of identity pulses from the ground-station beacon.

Heretofore, long time-constant networks have been employed in the input circuit of the switching device mentioned above in order to avoid undesirable interruptions referred to as splits in the two-second interval in the tone signal. An explanation of these splits follows hereinafter. Quite frequently the reply pulses and the identity-indicating pulses from a ground-station beacon are temporarily lost by the airborne interrogator-responser for various reasons, for example, the surface of the aircraft might shield the receiving antenna of the craft during a turning operation or the beacon may have had a temporary or momentary interruption in operation. Accordingly, it is possible that after a predetermined number of identity pulses of a pulse group is received by the interrogator-responser so that the switching device is conditioned to translate a tone signal to its output circuit, the train or series of identity pulses is interrupted for the reasons just mentioned. Consequently, the switching device would momentarily cease to translate the tone signal to its output circuit, thereby creating a split in the tone signal, unless the input circuit employed a long time-constant network to retain the charge created by the pulses prior to the interruption thereof, which charge would maintain the switching device in a translating condition during the interruption interval. While the long time-constant network is effective to reduce the frequency of occurrence of the interruptions or splits in the two-second tone signal, it requires a condenser having a relatively large capacitance and also requires a relatively large number of successive identity pulses to place the switching device in a translating condition for the tone signal and further renders the switching device susceptible to undesirable noise pulses occurring shortly after the last pulse of each of a group of identity pulses. The time-constant network has a long exponential decay characteristic so that a large amplitude random noise pulse, or an applied spurious interrogating pulse or pulses from nearby aircraft interrogating the same beacon, occurring during the exponential decay interval triggers or renders the switching device conductive shortly after it has ceased to conduct, thus undesirably prolonging the duration of the two-second tone pulse. This may, in turn, cause the tone pulse to overlap the succeeding airport-identification signal which, as previously stated, may be a Morse-code signal. This overlapping of information may create an erroneous Morse code airport-identification signal or an unintelligible signal which can be very confusing to the aviator.

Because of the above-mentioned undesirable effects of the long time-constant network, efforts have been unsuccessfully made to reduce the time constant of the network in the input circuit of the switching device. Shortening this time constant resulted in a steeper exponential decay characteristic but was conducive to creating splits in the tone signal when there occurred a momentary interruption in the reception of a series of identity pulses from the beacon. As a result, it has been customary to effect a compromise between a long time-constant network and a short time-constant network in the input circuit of the switching device in order to secure fairly satisfactory operation of the identity-indicating equipment of the interrogator-responser. This compromise has not proved too satisfactory when the identity-indicating system of the radio position locator is employed in regions of heavy aircraft traffic such as occurs near the airports of the major cities. Under some conditions in such regions, nonacceptable or confusing identity information of the type mentioned above may be received from the ground station and the airport-identity transmitter associated with that beacon for about thirty to forty percent of the time. Obviously, it is desirable to reduce this figure to one which is much lower in order to aid the pilot in navigating his craft in a region of high traffic where the absence of confusion is of major importance.

It is an object of the invention, therefore, to provide for use in a radio position locator a new and improved identity-indicating system which avoids one or more of the above-mentioned disadvantages and limitations of prior such systems.

It is another object of the invention to provide for use in a radio position locator a new and improved identity-indicating system which exhibits greater immunity to applied random noise pulses and other spurious pulses than prior such systems.

It is a further object of the present invention to provide for use in a radio position locator a new and improved identity-indicating system which is effective materially to reduce the extent of the confusing identity information which the busy pilot of an aircraft must endeavor to comprehend in a region of high aircraft traffic density.

It is a still further object of the invention to provide for use in a radio position locator a new and improved identity-indicating system which is relatively simple in construction and inexpensive to manufacture.

In accordance with a particular form of the invention, an identity-indicating system for a radio position locator comprises a circuit for supplying recurrent pulse groups each of which normally contains a continuous series of identity pulses but is subject to interruptions thereof and to random noise pulses. The identity-indicating system further includes an indicating-signal supply circuit and a circuit for utilizing a supplied indicating signal. The system additionally comprises a control apparatus coupled to the aforesaid supply circuits and the utilizing circuit and normally effective to prevent translation of the aforesaid signal to the utilizing circuit and including a first integrating network responsive to a predetermined number of successive ones of the identity pulses for causing the apparatus to effect the aforesaid translation of that signal until approximately the time of termination of the continuous or interrupted series but undesirably ineffective to cause the apparatus to effect translation of the signal during the interruption intervals of the interrupted series in the absence of the noise pulses during the aforesaid intervals. The system further includes a control circuit means responsive to the translated signal and including a second integrating network for deriving thereacross from the translated signal and applying to the aforesaid first network a first control effect causing the apparatus to effect the aforesaid signal translation during the interruption intervals in the absence of the noise pulses and for deriving and applying to the first network at the termination of the translated signal a second control effect which effectively prevents the control apparatus from responding to the noise pulses occurring after the aforesaid termination and undesirably translating the signal.

For a better understanding of the present invention, together with other and further objects thereof, reference is had to the following description taken in connection with the accompanying drawings, and its scope will be pointed out in the appended claims.

Figure 2:
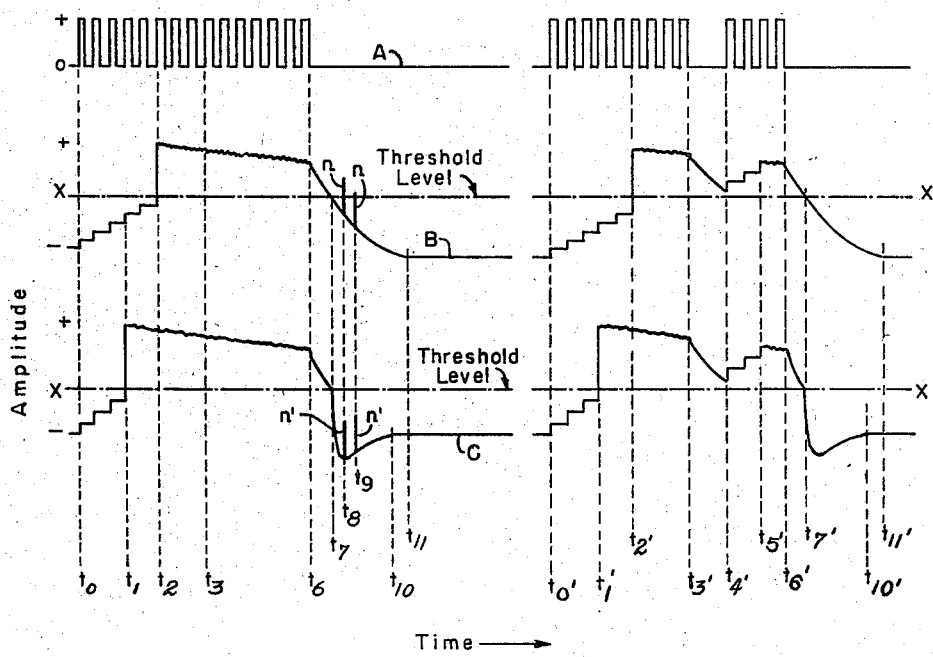

Referring to the drawings:

Fig. 1 is a circuit diagram, partly schematic, of a radio position locator for distance-measuring equipment including an identity-indicating system in accordance with the present invention, and Fig. 2 is a graph utilized in explaining the operation of the identity-indicating system of Fig. 1.

*Description of Fig. 1 radio position locator*

Referring now more particularly to Fig. 1 of the drawings, the radio position locator or distance-measuring equipment, which will be assumed to be installed in an aircraft in flight, includes means for transmitting periodic time-reference pulses aid for receiving from a terrestrially located responder beacon position-representative pulses and identity pulses. The transmitting means includes a timer 10 coupled to a transmitter 11 for supplying periodic timing pulses thereto. A time-delay network 12, which includes a suitable amplifier or polarity-reversing device, is also coupled between the timer 10 and the transmitter 11 for supplying to the latter periodic pulses delayed with respect to the pulses from the timer. The transmitter is designed to transmit periodic time-reference pulses in the form of wave-signal pulses of predetermined duration and spacing representative of the interrogating code of the distance measuring equipment. The time-delay network 12 is also coupled to a pair of input terminals 13, 13 of a control unit 14 for supplying control pulses of negative polarity thereto. The control unit 14 comprises a sweep generator 19 and a control device 34 therefor preferably constructed and arranged in accordance with correspondingly designated units of Fig. 1 in applicant's copending application Serial No. 354,747, filed May 13, 1953, now Patent No. 2,790,167, Apr. 23, 1957, entitled "Tracking System for Radio Position Locator." In the description which follows of the various units of the radio position locator of the present invention, with the exception of the identity-indicating system which is constructed in accordance with the present invention and will be described subsequently, those units which correspond in function with the corresponding units of the radio position locator of applicant's copending application are identified with the same reference numerals since these units may be identical in structure and in mode of operation. In each instance, reference is made to that copending application for the details of construction. The radio position locator also includes a conventional receiver 15 coupled to an antenna system 16 common to the transmitter and the receiver. An output circuit of the transmitter 11 may be coupled to the receiver 15 for supplying negative polarity disabling pulses to the receiver each time the transmitter develops a radio-frequency pulse for application to the antenna system 16.

The radio position locator also includes a tracking-gate generator 17 which is responsive to the applied pulses of negative polarity for generating positive polarity tracking pulses of substantially constant duration. To this end, the tracking-gate generator includes an input circuit which is coupled to the output circuit of the sweep generator 19 of unit 14 and an output circuit which is coupled to an input circuit of a first pulse decoder 47. As explained in detail in applicant's above-mentioned copending application, the sweep generator 19 is a synchronized sweep generator of the phantastron type which is capable of developing a sweep voltage of controllable duration at its anode and simultaneously developing a rectangular pulse of controllable duration at its screen electrode when triggered by the application of a negative polarity pulse to the terminals 13, 13. Generator 19 also includes a differentiating circuit coupled between its screen electrode and the input circuit of the tracking-gate generator 17. The control device 34 of unit 14 is a potential-responsive device such as a direct-current amplifier making use of the Miller effect and which has its input circuit coupled to the output circuit of a unit 53, 54 comprising track-in and track-out control circuits. An output circuit of control device 34 is connected to a distance indicator 45 which may be in the form of a voltmeter calibrated in terms of distance.

The first pulse decoder 47, which has one of its input circuits coupled to the output circuit of the receiver 15 and its output circuit coupled to a wide pulse generator 48 such as a multivibrator, preferably comprises a coincidence detector which is responsive jointly to the tracking pulses from the tracking-gate generator 17 and the first receiver pulse $a$ (see curve above decoder 47) of a train of coded reply pulses $a$, $b$, $c$ for developing with the generator 48 in the output circuit of the latter a series of pulses having substantially constant durations. The output circuits of the tracking-gate generator 17 and the wide pulse generator 48 are connected to the input circuits of a coincidence detector 49 which develops in its output circuit pulses having durations representative of the time relation between the received pulses and the tracking pulses. The output circuit of the coincidence detector 49 is coupled to the track-in portion of the unit 53, 54 for applying thereto the output pulses of unit 49.

The output circuit of the wide pulse generator 48 is also coupled to a second pulse decoder 64 which is preferably of the coincidence detector type and has a differentiating circuit in its input circuit. Another input circuit of unit 64 is coupled to the output circuit of receiver 15 and the output circuit of the former is coupled to the input circuits of a search control circuit 65 and a wide pulse generator 20 which may also be a multivibrator. The latter develops output pulses having durations equal to the spacing between the second pulse $b$ of the received train of pulses and the third or identity pulse $c$ of that train. The output circuit of the search control circuit 65 is coupled through a resistor 57 to the track-out portion of the track-in and track-out control circuit 53, 54 and develops control voltages of such magnitude and polarity as to control the operation of unit 53, 54 which, in turn, determines whether the radio position locator of Fig. 1 operates in its searching or tracking mode. The output circuit of the wide pulse generator 48 is also coupled through a condenser 56, which with resistor 57 comprises a differentiating circuit, to the track-out input circuit of unit 53, 54.

The output circuit of the wide pulse generator 20 is coupled to one input circuit of an identity pulse decoder 21, also preferably of the coincidence type, having another input circuit coupled from receiver 15 and its output circuit coupled to a pair of input terminals 22, 22 of an identity-indicating system 23 which is constructed in accordance with the present invention and will be described in detail subsequently. Briefly, however, the system 23 includes a tone-signal generator 24 coupled to the anode of an electron-discharge switching device 25 which has its control electrode coupled to the terminals 22, 22 and the high-potential terminal of its cathode resistor 26 coupled through resistor 30 to a sound-signal reproducing device such as a pair of headphones 27.

Operation of Fig. 1 radio position locator

A precise explanation of the operation of the radio position locator of Fig. 1, exclusive of that of units 20, 21 and 23, appears in applicant's above-identified copending application and reference is made thereto for a detailed consideration thereof. However, a general explanation of the operation of the locator of Fig. 1 will prove helpful in understanding the subsequent description and explanation of the operation of the identity-indicating system 23. The application of a control pulse by the timer 10 to the transmitter 11 causes it to develop and radiate from the antenna system 16 a first wave-signal pulse. Simultaneously, a control pulse is applied by the timer 10 to the time-delay network 12 which develops a second pulse that is delayed with respect to the first control pulse in accordance with a pre-established code determined by the setting of the parameters of the network. The delayed pulse is, in turn, applied to the transmitter 11 for developing and radiating the second wave-signal pulse of a pulse pair. Network 12 also delivers a negative polarity pulse at the time of the second pulse of the pair to the sweep generator 19 of control unit 14 for triggering that generator. A ground-station beacon (not shown) replies to the paired pulse interrogation by the transmitter 11 and radiates coded wave-signal reply pulses which are intercepted by the antenna system 16 and applied to the receiver 15 which derives in its output circuit the unidirectional pulse pair $a$, $b$ having a predetermined spacing and also the identity pulse $c$ having a predetermined spacing from the second pulse $b$. This operation repeats itself each time the timer 10 applies a control pulse to the transmitter 11.

It will now be assumed that a plurality of trains of pulses corresponding to those represented above decoder 47 in Fig. 1 of the drawings has been received and that the search control circuit 65 has been actuated to develop in its output circuit a control potential for controlling circuits of unit 53, 54. This, in turn, causes control device 34 to so regulate the sweep of sweep generator 19 as to develop output pulses, the negatively poled ones of which control the tracking-gate generator so that portions of its tracking pulses are coextensive in time with the first pulse of each train of reply pulses from the ground-station beacon. The coincident application of the tracking pulses and the first received pulses of such a train develops a series of output pulses in the output circuit of the decoder 47 for application to the wide pulse generator 48 at times corresponding with those of the leading edges of the received first pulses. The long duration output pulses from generator 48 which are applied to the coincidence detector 49 along with the tracking pulses from the tracking-gate generator 17 render that detector conductive and develop in its output circuit a series of pulses having durations corresponding to the intervals during which the tracking pulses and the wide pulses are coextensive in time. The durations of successive ones of the output pulses of the coincidence detector 49 will vary in a sense depending on whether the aircraft is approaching or moving away from the ground-station beacon. When the aircraft is approaching the beacon for example, the first pulses of the trains of reply pulses occur sooner with reference to their corresponding tracking pulses and develop in the output circuit of the coincidence detector 49 output pulses of progressively greater duration. These pulses have a greater energy content than positive polarity pulses comprising the differentiated leading edges of the wide pulses applied through condenser 56 to the track-out control circuit 54. Accordingly, unit 53, 54 develops in its output circuit a varying voltage which serves to cause the control device 34 and the sweep generator 19 so as to control the tracking-gate generator 17 as to develop tracking pulses which track each of the first received pulses of a train of pulses *a*, *b*, and *c*.

The second pulse decoder 64 responds to the wide pulse from generator 48 and the second received pulse *b* of each train of pulses and develops in the output circuit of unit 64, for application to units 65 and 20, a decoded pulse having a leading edge corresponding to the leading edge of the received pulse *b*. As previously mentioned, successive groups of such pulses actuate the search control circuit and cause it to develop a voltage which, in turn, controls the tracking circuits of unit 53, 54 in a manner to permit the radio position locator to operate in its tracking mode. The decoded pulse from the second pulse decoder 64 actuates the wide pulse generator 20 and causes it to develop an output pulse having a duration corresponding to the separation between the second pulse *b* and the identity pulse *c* of the train of pulses applied to the other input circuit of the identity pulse decoder 21. The latter is rendered conductive at the time of the leading edge of each identity pulse *c* and applies to the input terminals 22, 22 of the identity-indicating system 23 recurrent pulse groups normally containing a continuous series of identity pulses. A predetermined number of such pulses serves to apply to, or build up on, the control electrode of the switching device 25 a potential sufficient to overcome the threshold level of that tube, thereby rendering it conductive and causing it to translate, from its anode to its cathode and to the headphones 27, positive half cycles of the tone signal supplied by tone generator 24. Each group of recurrent identity pulses is effective to develop a 400-cycle tone pulse having a duration, in accordance with a particular embodiment of the invention, of approximately two seconds in the headphones 27. These tone pulses inform the aviator that his receiver 15 is receiving reply pulses from a ground-station beacon.

The control voltage developed in control device 34 during the tracking operation of the radio position locator and applied to the distance indicator 45 is of such magnitude as to provide an indication representative of the distance between the radio position locator on the aircraft and the ground-station beacon.

*Description of identity-indicating system 23 of Fig. 1*

The identity-indicating system of Fig. 1 comprises a circuit which includes the input terminals 22, 22 for supplying recurrent pulse groups each of which normally contains a continuous series of identity pulses as mentioned above but is subject to interruptions thereof and to random noise pulses. These recurrent pulse groups comprise the identity pulses which, in accordance with the mode of operation of the ground-station beacon, are transmitted in suitable groups, such as 15 pulses, each pulse corresponding to the detected pulse *c*. A group of such identity pulses is represented by curve A of Fig. 2 on a time scale which is considerably compressed with reference to that of the pulses *a*, *b*, and *c* appearing in Fig. 1, the paired pulses *a*, *b* being omitted in the Fig. 2 representation since they do not appear in the output circuit of the identity pulse decoder 21. The interruptions referred to above may be caused by atmospheric conditions in the wave-signal propagation path between the radio position locator and the beacon, momentary interruptions in the operation of the beacon, or by the surface of the aircraft shielding the antenna system 16 during a turning operation of that craft.

The identity-indicating system 23 also includes an indicating-signal supply circuit which comprises an input terminal 28 and an anode load resistor 29 coupled between the tone generator 24 and the anode of the electron-discharge device 25 which is preferably of the gaseous-discharge type such as a Thyratron. The tone generator 24 preferably develops a 400-cycle tone signal to which the ear is very responsive. The system 23 further comprises a circuit including a sound-signal reproducing device, such as the headphones 27, for utilizing the sound signal applied to the device 25 by the tone generator. The headphones 27 in the utilizing circuit are coupled through a resistor 30 to the cathode of tube 25. The cathode resistor 26 is also coupled to a pair of input terminals 50, 50.

The identity-indicating system further comprises a control apparatus including the tube 25 which has an input circuit coupled to the pulse-supply circuit including terminals 22, 22 and having an output circuit coupled to the utilizing circuit including headphones 27. This input circuit comprises a time-constant network 31 which is coupled to the terminals 22, 22 and coupled to the control electrode of tube 25 through an isolating resistor 32 having a large value of resistance of the order of several megohms. The parameters of this network are proportioned so that it is responsive to a predetermined number, such as four, of the successive ones of the identity pulses of a group of pulses for causing the identity-indicating apparatus to effect translation of the tone signal until approximately the time of termination of the continuous series of identity pulses but is undesirably ineffective to cause the apparatus to effect translation of the tone signal during the interruption intervals of an interrupted series in a group of identity pulses. The network 31 effectively comprises a resistor 33 coupled between the ungrounded one of the input terminals 22, 22 and the resistor 32 and also includes a storage condenser 44 coupled between the junction of the resistors just mentioned and ground. This network further includes a fixed resistor 35 coupled between the aforesaid junction and a potentiometer 36 having its tap 37 connected to resistor 35 and the remote ends of the potentiometer connected to unidirectional voltage sources —C and —C′ for developing a charge across the condenser 44 which is effective normally to maintain the tube 25 below its striking or threshold potential. A resistor 38, which is connected between the screen electrode and ground, and a condenser 39 coupled between the cathode and ground together constitute ground returns which control, in part, the igniting and deionization characteristics of the tube 25.

The indicating system 23 additionally includes a control or feed-back circuit which is coupled between the output circuit of tube 25 and the network 31 and is responsive to the signal translated to the cathode output circuit of tube 25 for deriving and applying to the network 31 a control effect or potential that causes tube 25 to effect signal translation during the interruption intervals of the groups of identity pulses. This control circuit comprises a rectifier system including a rectifier device 40 and a time-constant load impedance 41 therefor, the latter including a condenser 42 connected in parallel with a resistor 43 and constituting a 400-cycle filter network. One terminal of network 41 is connected to ground and the other terminal is connected to the resistor 32 through a coupling condenser 45. The network 31 has a time constant which is much greater than that of the network 41.

*Operation of identity-indicating system 23*

In considering the operation of the identity-indicating system 23, it will be assumed initially that the control circuit including the rectifier device 40 and its load impedance 41 is not coupled between the cathode of tube 25 and its input circuit. It will also be assumed that the time constant of the impedance network 31 or a similar such network is considerably longer than it would be if the control circuit just mentioned were employed. It will further be assumed that a group of 15 pulses comprising a continuous series thereof is applied by the identity pulse decoder 21 to the input terminals 22, 22 and that about six of these pulses, as represented in curve A of Fig. 2, are required to charge the condenser 44 sufficiently in a positive sense to overcome the negative bias applied to the control electrode of tube 25 by way of the potentiometer 36 thereby exceeding the threshold level of the tube and rendering it conductive. At time $t_2$ shortly after the application of the first pulse at time $t_0$, the tube 25 becomes conductive and its control-electrode potential suddenly rises above the threshold level $x$—$x$ in a manner similar to that represented in curve B of Fig. 2. The sudden increase in control-electrode potential results from the well-known voltage division of the anode-to-control electrode potential in the ionized space-current path of the gas tube. When tube 25 becomes conductive, it is effective to translate to its cathode positive half cycles of the 400-cycle tone signal supplied to its anode by the tone generator 24. Curve B actually represents a potential variation appearing across the condenser 44 in the input circuit of tube 25 and the control electrode experiences a somewhat similar potential variation which has a greater swing at time $t_2$. The large resistor 32 tends to isolate the condenser 44 somewhat from the larger voltage swing experienced at the control electrode at time $t_2$. During the interval $t_0$–$t_6$, therefore, the continuous succession of pulses of curve A is instrumental in rendering the tube conductive so as to translate positive half cycles of the tone signal to the headphones 27 which develop an output signal effectively sounding like a 400-cycle tone signal. During interval $t_2$–$t_6$, the potential across the condenser 44 may decrease slightly and will appear somewhat serrated because of the alternating signals applied to the anode of tube 25. Time $t_6$ marks the termination of a group of identity pulses and during the interval $t_6$–$t_7$ the potential across the condenser 44 decays generally exponentially to the threshold level $x$—$x$ as a result of the discharge of the condenser to a more negative value. The tube 25 ceases to conduct at about time $t_7$ and the potential across the condenser further decreases exponentially until time $t_{11}$ when it assumes a value established by the level set by the potentiometer 36. At time $t_0'$, another group of identity pulses is applied to the input terminals 22, 22 and the described cycle of operation of tube 25 begins to repeat itself. The operation during the interval $t_0'$–$t_6'$ will be explained subsequently.

During the interval $t_{11}$–$t_0'$, airport-identifying information is ordinarily transmitted from a separate transmitter at an airport and this information is applied by a separate receiver through terminals 50, 50 to the headphones 27. This airport-identifying information may be voice-modulated or may constitute a Morse code signal and it is highly important to the pilot that the tone signal shall not overlap or mask out the airport-identifying information. For the assumed condition wherein the network 31 has a long time constant, random noise pulses $n$, $n$ occurring at times $t_8$ and $t_9$, shortly after the tube 25 has ceased at time $t_7$ to translate a tone signal to the headphones 27, may raise the control-electrode potential of tube 25 above its threshold level $x$—$x$ so that the aviator hears a second and confusing tone pulse in his headphones. Alternatively, random noise pulses (not shown) may occur at time $t_7$ and for a period of time thereafter so that the tube 25 may undesirably be maintained in a conductive condition for a rather extended period of time such that the tone pulse may overlap at least some or possibly all of the airport-identifying information occurring during interval $t_{11}$–$t_0'$. This would ordinarily cause the 400-cycle tone signal to mask out some or all of the airport-identifying information and would confuse the pilot.

Should the group of identity pulses comprise an interrupted series, as represented during the interval $t_0'$–$t_6'$ by curve A of Fig. 2, which interruption occurs approximately during the interval $t_3'$–$t_4'$, the potential across the condenser 44 decreases exponentially during that interval, as represented by curve B, and, if three or more identity pulses are missing, drops below the threshold level. It will be assumed that the parameters of the input circuit of the tube 25 including the time constant network 31 are such that two missing identity pulses will not cause the potential on the control electrode of tube 25 to drop below the threshold level $x$—$x$. Tube 25 remains in a translating state for the brief interval of time $t_3'$–$t_4'$ although the control-electrode potential varies as represented by curve B of Fig. 2 during that interval because of the exponential decay across condenser 44. At time $t_4'$ when an identity pulse is again applied to the input terminals 22, 22 of unit 23, the control electrode potential increases in a step-like manner as represented during interval $t_4'$–$t_5'$. The potential across the condenser 44 during the interval $t_5'$–$t_{11}'$ then varies, as represented by curve B. If three or more identity pulses in a series are missing (not shown in curve B of Fig. 2), the interruption interval in the series of identity pulses creates a related interruption interval in the tone pulse translated during interval $t_2'$–$t_7'$ to the headphones 27 thus effectively creating two tone pulses which may sound like a letter in Morse code or, with the succeeding Morse code signals appearing after the time $t_{11}'$, may supply the aviator with confusing or erroneous information. Interruptions of three or more pulses in the series of identity pulses in recurrent groups of such pulses create in the headphones 27 what are known as undesirable splits which are looked upon by aviators as a navigation uncertainty or hazard.

As previously mentioned, the large time constant of the network 31 will help to avoid these undesirable splits but will render the identity-indicating system particularly susceptible to random noise pulses occurring shortly after the termination of each group of recurrent identity pulses which is applied to terminals 22, 22. The identity-indicating system of the present invention avoids the difficulties referred to above with reference to the noise pulses.

It will now be assumed that the control circuit including rectifier device 40 and its load circuit 41 is coupled to the time-constant network 31 through the coupling condenser 45 and that the parameters of network 31 have been selected so that its time constant is relatively short, for example, less than half that considered above in connection with the discussion of the curve B of Fig. 2. The potential variation now appearing across condenser 44 for the conditions presently under consideration may be represented by curve C of Fig. 2. Since the time constant of the network 31 is shorter than that for the condition previously considered, about four consecutive identity pulses are effective to charge the condenser 44 sufficiently to cause the control electrode of tube 25 to reach its threshold level, thereby causing it to be conductive and to translate a tone signal to the headphones 27 through the space-current path of the tube during the interval $t_1$–$t_6$ and also during the succeeding short interval $t_6$–$t_7$. Despite the short time constant of the network 31, the exponential decay of the potential appearing across the condenser 44 during the interval $t_6$–$t_7$ is about the same as for the condition represented by curve C because of the action of the feed-back circuit. At time $t_7$, the potential wave of curve C reaches the threshold level $x$—$x$ and then, for reasons not well understood but believed to be a gas-tube phenomenon, experiences a negative overshoot which thereafter swings more positive and at time $t_{10}$ arrives at the level established by the setting of the potentiometer 36. One explanation which may be advanced is that at time $t_7$ the tube 25 ceases to conduct because the potential of its control electrode has dropped below its threshold level. Consequently, tone-signal energy from the cathode of tube 25 is no longer fed through the diode 40 to the network 41. As a result, the potential appearing across the condenser 42 conducts somewhat exponentially as the condenser discharges rather abruptly through the resistor 43. The time constant of the network 41 is short with reference to the interval between successive identity pulses and the condenser 42 soon drops to ground potential. The negative swing experienced across condenser 42 is translated by condenser 45 to the condenser 44 and thus pulls the control electrode of tube 25 negatively at the same time. It will be observed from curve C that random noise pulses $n'$, $n'$ occurring at times $t_9$ and $t_{10}$ are superimposed on the potential wave at points which are well below the threshold level $x$—$x$ and, therefore, are not effective to cause the tube 25 to become conductive. Consequently, a second tone pulse or an overlapping of the regular tone pulse with the airport-identifying information does not occur.

During the interval $t_1'$–$t_6'$, the potential across the condenser 44 varies in the manner represented by curve C even though the second group of pulses of curve A constitutes an interrupted series thereof. This occurs because positive half cycles of the 400-cycle signal translated to the cathode of tube 25 during its conduction intervals are rectified by device 40 and the positive unidirectional potential developed at the cathode of the latter is filtered by the action of the network 41 and is translated to the junction of resistor 32 and the storage condenser 44 by the coupling condenser 45. For the application of this positive potential to the condenser 44, the network 41 may be looked upon as a battery supplying across a voltage divider comprising the serially connected condensers 45 and 44 a potential for application through the resistor 32 to the control electrode of the tube 25. The positive potential developed by the rectifying action of device 40 effectively augments the potential developed across condenser 44 by the first series of pulses appearing during the interval $t_0'$–$t_3'$ and, in effect, compensates for the identity pulses which are missing during the interruption interval $t_3'$–$t_4'$ so as to keep the tube 25 in a translating condition until the series of identity pulses is resumed at aproximately time $t_4'$, thereby keeping the tube 25 in a condition effectively to translate to the headphones 27 what is interpreted by the ear as a continuous tone pulse during the interval $t_1'$–$t_7'$. Thus, the feed-back circuit of the identity-indicating system 23 is effective to avoid confusing splits of the type described above.

The use of the feed-back network between the cathode of tube 25 and the network 31 not only permits the time constant of the network 31 to be about half of that which ordinarily would be required but also permits the use of a smaller and less costly condenser in the input circuit of tube 25. The identity-indicating system, in addition to avoiding unwanted splits, is definitely less susceptible to noise occurring at the termination of a group of recurrent identity pulses. Accordingly, nonacceptable or confusing identity information, which heretofore has been received by the aviator from the ground-station beacon and the airport-identity transmitter for about thirty to forty percent of the time with prior identity-indicating systems, is materially reduced. In practice, it has been found that in the vicinity of a busy airport this confusing information now appears but about six percent of the time as compared with the greater figure just mentioned. Obviously, a pilot is much safer and, hence, has confidence in an identity-indicating system in accordance with the present invention.

While applicant does not want to limit the invention to any specific circuit constants, the following constants are given as illustrative of values of the circuit elements which may be used in the circuit of Fig. 1:

| | |
|---|---|
| Resistor 26 | 1.8 kilohms. |
| Resistor 29 | 3.3 kilohms. |
| Resistor 30 | 470 ohms. |
| Resistors 32, 35 | 4.7 megohms. |
| Resistor 33 | 3.9 megohms. |
| Resistors 38, 43 | 100 kilohms. |
| Potentiometer 36 | 10 kilohms (max.). |
| Condenser 39 | 0.047 microfarad. |
| Condenser 42 | 0.18 microfarad. |
| Condenser 44 | 0.12 microfarad. |
| Condenser 45 | 0.068 microfarad. |
| Tube 25 | Type 2D21 or Type 5726. |
| —C | —15 volts. |
| —C' | —8 volts. |
| Tone signal from generator 24 | 115-volt, 400-cycle tone. |
| Amplitude of pulse applied to terminals 22, 22 | About 60 volts. |
| Repetition rate of pulses in each group applied to terminals 22, 22 | 15 per second. |

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. An identity-indicating system for a radio position locator comprising: a circuit for supplying recurrent pulse groups each of which normally contains a continuous series of identity pulses but is subject to interruptions thereof and to random noise pulses; an indicating-signal supply circuit; a circuit for utilizing a supplied indicating signal; control apparatus coupled to said supply circuits and said utilizing circuit and normally effective to prevent translation of said signal to said utilizing circuit and including a first integrating network responsive to a predetermined number of successive ones of said identity pulses for causing said apparatus to effect said translation of said signal until approximately the time of termination of said continuous or interrupted series but undesirably ineffective to cause said apparatus to effect translation of said signal during the interruption intervals of said interrupted series in the absence of said noise pulses during said intervals; and control circuit means responsive to said translated signal and including a second integrating network for deriving thereacross from said translated signal and applying to said first network a first control effect causing said apparatus to effect said signal translation during said interruption intervals in said absence of said noise pulses and for deriving and applying to said first network at the termination of said translated signal a second control effect which effectively prevents said control apparatus from responding to said noise pulses occurring after said termination and undesirably translating said signal.

2. An identity-indicating system for a radio position locator comprising: a circuit for supplying recurrent pulse groups each of which normally contains a continuous series of identity pulses but is subject to interruptions thereof and to random noise pulses; an indicating-signal supply circuit; a circuit for utilizing a supplied indicating signal; control apparatus including a first input circuit coupled to said indicating-signal supply circuit, a second input circuit coupled to said pulse-supply circuit, and an output circuit coupled to said utilizing circuit and normally effective to prevent translation of said signal to said utilizing circuit and including a first integrating network in said second input circuit responsive to a predetermined number of successive ones of said identity pulses for causing said apparatus to effect said translation of said signal until approximately the time of termination of said continuous series but undesirably ineffective to cause said apparatus to effect translation of said signal during the interruption intervals of said interrupted series in the absence of said noise pulses during said intervals; and control circuit means coupled to said output circuit and said network and responsive to said translated signal and including a second integrating network for deriving thereacross from said translated signal and applying to said first network a first control effect causing said apparatus to effect said signal translation during said interruption intervals in said absence of said noise pulses and for deriving and applying to said first network at the termination of said translated signal a second control effect which effectively prevents said control apparatus from responding to said noise pulses occurring after said termination and undesirably translating said signal.

3. An identity-indicating system for a radio position locator comprising: a circuit for supplying recurrent pulse groups each of which normally contains a continuous series of identity pulses but is subject to interruptions thereof and to random noise pulses; an indicating-signal supply circuit; a circuit for utilizing a supplied indicating signal; control apparatus including a first input circuit coupled to said indicating-signal supply circuit, a second input circuit coupled to said pulse-supply circuit, and an output circuit coupled to said utilizing circuit and normally effective to prevent translation of said signal to said utilizing circuit and including a first integrating network in said second input circuit responsive to a predetermined number of successive ones of said identity pulses for causing said apparatus to effect said translation of said signal until approximately the time of termination of said continuous series but undesirably ineffective to cause said apparatus to effect translation of said signal during the interruption intervals of said interrupted series in the absence of said noise pulses during said intervals; and feed-back circuit means coupled between said output circuit and said second input circuit and responsive to said translated signal and including a second integrating network for deriving thereacross from said translated signal and applying to said first network a first control effect causing said apparatus to effect said signal translation during said interruption intervals in said absence of said noise pulses and for deriving and applying to said first network at the termination of said translated signal a second control effect which effectively prevents said control apparatus from responding to said noise pulses occurring after said termination and undesirably translating said signal.

4. An identity-indicating system for a radio position locator comprising: a circuit for supplying recurrent pulse groups each of which normally contains a continuous series of identity pulses but is subject to interruptions thereof and to random noise pulses; an indicating-signal supply circuit; a circuit for utilizing a supplied indicating signal; control apparatus including a gaseous-discharge device having a first input circuit coupled to said indicating-signal supply circuit, a second input circuit including biasing means and coupled to said pulse-supply circuit and having an output circuit coupled to said utilizing circuit and normally effective because of said biasing means to prevent translation of said signal to said utilizing circuit and including a first integrating network in said second input circuit responsive to a predetermined number of successive ones of said identity pulses for causing said device to effect said translation of said signal until approximately the time of termination of said continuous series but undesirably ineffective to cause said apparatus to effect translation of said signal during the interruption intervals of said interrupted series in the absence of said noise pulses during said intervals; and control circuit means coupled between said output circuit and said network responsive to said translated signal and including a second integrating network for deriving thereacross from said translated signal and applying to said first network a first control effect causing said apparatus to effect said signal translation during said interruption intervals in said absence of said noise pulses and for deriving and applying to said first network at the termination of said translated signal a second control effect which effectively prevents said control apparatus from responding to said noise pulses occurring after said termination and undesirably translating said signal.

5. An identity-indicating system for a radio position locator comprising: a circuit for supplying recurrent pulse groups each of which normally contains a continuous series of identity pulses but is subject to interruptions thereof and to random noise pulses; an indicating-signal supply circuit; a circuit for utilizing a supplied indicating signal; control apparatus coupled to said supply circuits and said utilizing circuit and normally effective to prevent translation of said signal to said utilizing circuit and including an integrating network responsive to a predetermined number of successive ones of said identity pulses for causing said apparatus to effect said translation of said signal until approximately the time of termination of said continuous series but undesirably ineffective to cause said apparatus to effect translation of said signal during the interruption intervals of said interrupted series in the absence of said noise pulses during said intervals; and control circuit means coupled to said network and including a rectifier device and a time-constant load impedance therefor responsive to said translated signal for deriving therefrom and applying to said network a unidirectional control effect causing said apparatus to effect said signal translation during said interruption intervals in said absence of said noise pulses and for deriving and applying to said network at the termination of said translated signal a second control effect which effectively prevents said control apparatus from responding to said noise pulses occurring after termination and undesirably translating said signal.

6. An identity-indicating system for a radio position locator comprising: a circuit for supplying recurrent pulse groups each of which normally contains a continuous series of identity pulses but is subject to interruptions thereof and to random noise pulses; an indicating-signal supply circuit; a circuit for utilizing a supplied indicating signal; control apparatus including an electron-discharge device having an anode, a control electrode, and a cathode, a cathode resistor therefor, with said anode coupled to said indicating-signal circuit and said control electrode and said cathode coupled to said pulse-supply circuit, said utilizing circuit coupled to said cathode, means coupled to said control electrode and said cathode and normally effective to maintain said device in a nonconductive condition and prevent translation of said signal to said utilizing circuit, and further including a first integrating network coupled to said control electrode and said cathode and responsive to a predetermined number of successive ones of said identity pulses for rendering said device conductive to effect said translation of said signal until approximately the time of termination of said continuous series but undesirably ineffective to cause said device to effect translation of said signal during the interruption intervals of said interrupted series in the absence of said noise pulses during said intervals; and control circuit means responsive to said translated signal and including a second integrating network for deriving thereacross from said translated signal and applying to said first network a first control effect causing said apparatus to effect said signal translation during said interruption intervals in said absence of said noise pulses and for deriving and applying to said first network at the termination of said translated signal a second control effect which effectively prevents said control apparatus from responding to said noise pulses occurring after said termination and undesirably translating said signal.

7. An identity-indicating system for a radio position locator comprising: a circuit for supplying recurrent pulse groups each of which normally contains a continuous series of identity pulses but is subject to interruptions thereof and to random noise pulses; an indicating-signal supply circuit; a circuit for utilizing a supplied indicating signal; control apparatus including a gaseous-discharge device having an anode, a control electrode, and a cathode, a cathode resistor therefor, an isolating resistor coupled to said control electrode with said anode coupled to said indicating-signal circuit and said control electrode and said cathode coupled to said pulse-supply circuit, said utilizing circuit coupled to said cathode, means coupled to said control electrode and said cathode and normally effective to prevent translation of said signal to said utilizing circuit and further including an integrating network coupled to said control electrode and said cathode through said isolating resistor and responsive to a predetermined number of successive ones of said identity pulses for rendering said device conductive to effect said translation of said signal until approximately the time of termination of said continuous series but undesirably ineffective to cause said device to effect translation of said signal during the interruption intervals of said interrupted series in the absence of said noise pulses during said intervals; and means comprising a feed-back circuit including a rectifier device and a time-constant load impedance therefor coupled between said cathode and said network and responsive to said translated signal for deriving therefrom and applying to said network a first control effect causing said apparatus to effect said signal translation during said interruption intervals in said absence of said noise pulses and for deriving and applying to said network at the termination of said translated signal a second control effect which effectively prevents said control apparatus from responding to said noise pulses occurring after said termination and undesirably translating said signal.

8. An identity-indicating system for a radio position locator comprising: a circuit for supplying recurrent pulse groups each of which normally contains a continuous series of identity pulses but is subject to interruptions thereof and to random noise pulses; a periodic indicating-signal supply circuit; a circuit for utilizing a supplied indicating signal; control apparatus including a gaseous-discharge device having an anode, a control electrode, and a cathode, a cathode resistor therefor, an isolating resistor coupled to said control electrode with said anode coupled to said indicating-signal circuit and said control electrode and said cathode coupled to said pulse-supply circuit, said utilizing circuit coupled to said cathode, means coupled to said control electrode and said cathode and normally effective to prevent translation of said signal to said utilizing circuit and further including an integrating network coupled to said control electrode and said cathode through said isolating resistor and responsive to a predetermined number of successive ones of said identity pulses for rendering said device conductive to effect said translation of said signal until approximately the time of termination of said continuous series but undesirably ineffective to cause said device to effect translation of said signal during the interruption intervals of said interrupted series in the absence of said noise pulses during said intervals; and means comprising a feed-back circuit, including a rectifier device and an integrating network therefor coupled between said cathode and said first-mentioned network and having a time constant greater than the period of said signal but less than the interval between successive ones of said pulses, responsive to said translated signal for deriving therefrom and applying to said first-mentioned network a control effect causing said apparatus to effect said signal translation during said interruption intervals in said absence of said noise pulses and for deriving and applying to said first-mentioned network at the termination of said translated signal a second control effect which effectively prevents said control apparatus from responding to said noise pulses occurring after said termination and undesirably translating said signal.

9. A repeater system comprising: a circuit for supplying a pulse-type signal subject to noise pulses; a signal-supply circuit; a circuit for utilizing a supplied signal; control apparatus coupled to said supply circuits and said utilizing circuit and including an electron-discharge device normally effective to prevent translation of said supplied signal to said utilizing circuit and including a first integrating network responsive to said pulse-type signal for causing said apparatus to initiate translation of said supplied signal; and control circuit means responsive to said translated signal and including a second integrating network for deriving thereacross from said translated signal and applying to said first network a first control effect causing said apparatus effectively to continue said translation of said supplied signal for a predetermined time interval and for deriving and applying to said first network at the termination of said translated signal a second control effect which effectively prevents said control apparatus from responding to said noise pulses occurring after said termination and undesirably translating said signal.

10. A repeater system comprising: a circuit for supplying a pulse-type signal subject to undesired noise pulses; an alternating-current signal-supply circuit; a circuit for utilizing a supplied signal; control apparatus coupled to said supply circuits and said utilizing circuit and including an electron-discharge device having a space-current path coupled between said signal-supply circuit and said utilizing circuit and including a first integrating network normally effective to prevent translation of said supplied signal to said utilizing circuit but responsive to said pulse-type signal for causing said device to initiate translation of said supplied signal through said space-current path; and control circuit means responsive to said translated signal and including a second integrating network for deriving thereacross from said translated signal and applying to said first network a first control effect causing said apparatus to continue said translation of said supplied signal during the positive half cycles of said supplied signal for a predetermined time interval and for deriving and applying to said first network at the termination of said translated signal a second control effect which effectively prevents said control apparatus from responding to said noise pulses occurring after said termination and undesirably translating said signal.

References Cited in the file of this patent

UNITED STATES PATENTS

| | | |
|---|---|---|
| 2,140,350 | Dawson | Dec. 13, 1938 |
| 2,450,352 | Piety | Sept. 28, 1948 |
| 2,489,202 | Selinger | Nov. 22, 1949 |
| 2,491,029 | Brunn | Dec. 13, 1949 |
| 2,545,503 | Tucker | Mar. 20, 1951 |
| 2,552,174 | Holloway | May 8, 1951 |
| 2,592,737 | Reynolds | Apr. 15, 1952 |
| 2,678,437 | Coley | May 11, 1954 |